United States Patent Office 2,877,926
Patented Mar. 17, 1959

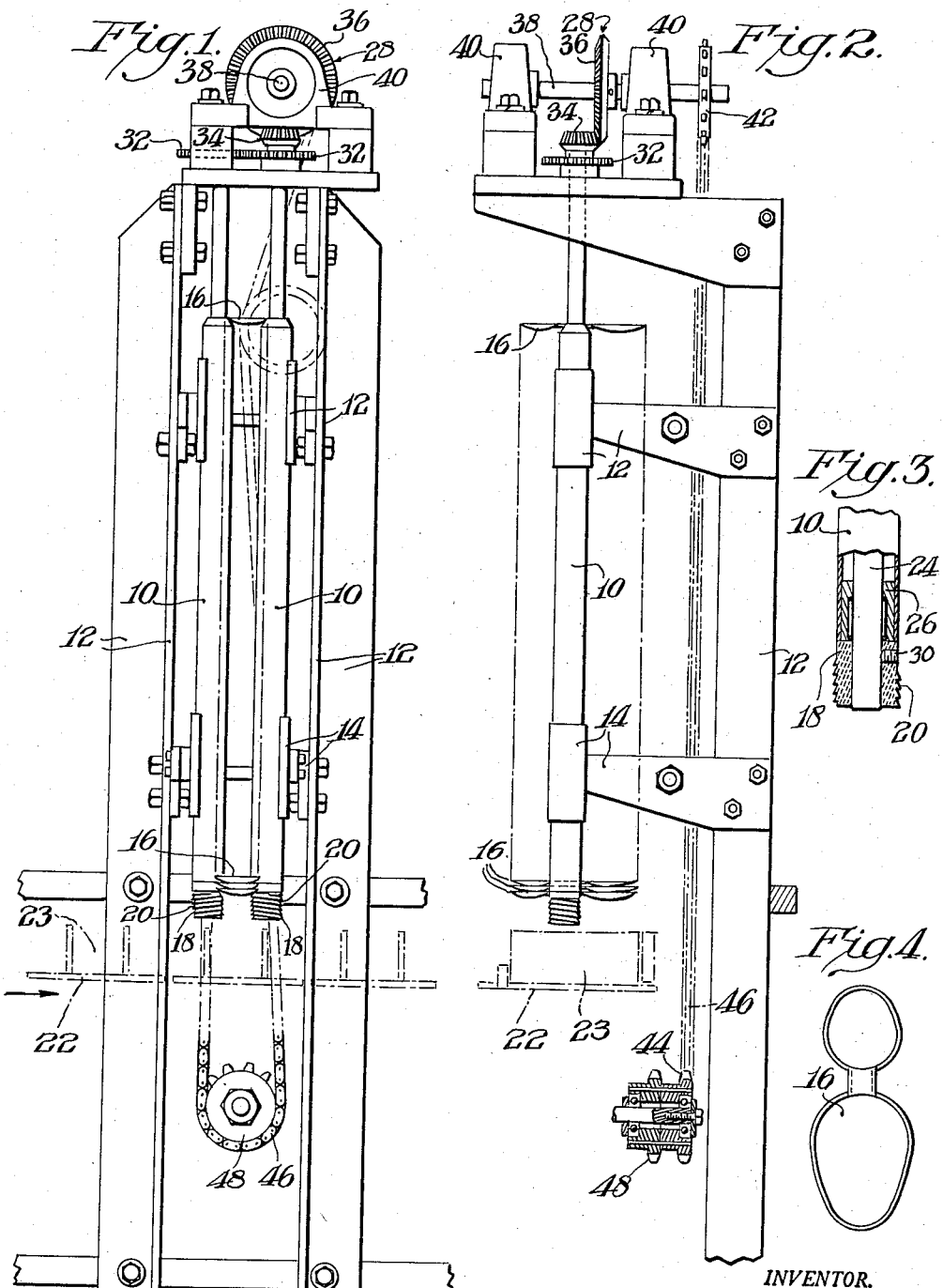

2,877,926

ARTICLE DISPENSING APPARATUS

Carl H. Abbé, Maspeth, N. Y., assignor to Chas. Pfizer & Co., Brooklyn, N. Y., a corporation of Delaware Application September 26, 1956, Serial No. 612,300

1 Claim. (Cl. 221—222)

This invention relates to an apparatus for successively dispensing articles at a constant rate, and more particularly to such an apparatus for successively dispensing necked articles.

In packaging articles for shipment, it frequently is necessary to include one small article in each carton. For example, a measuring spoon is sometimes included in packages containing a preparation such as a pharmaceutical composition.

An object of this invention is to provide a simple, economical and dependable apparatus for dispensing necked articles such as spoons, successively at a constant rate.

In accordance with this invention, stationary parallel rods are separated from each other at a distance providing a space corresponding to the necks of the articles to be dispensed. These articles are stacked within this space with their necks locked between the rods. Rotatable cylinders are mounted at the ends of these rods to form a continuation thereof. These cylinders include spiral projections extending within the space between the rods. Coordinated means are provided for rotating these cylinders in synchronism to cooperate with each other in abstracting and discharging articles from the stack. These dispensed articles may be received in the pockets of a conveyor which passes at a predetermined rate under the dispensing ends of the rods.

The necked articles are loaded at the ends of the stationary rods remote from the dispensing cylinders. Coordinated means for rotating the cylinders may include spindles passing through the centers of the rods. Articles may be easily and safely loaded between these rotating spindles because they are separated at a distance greater than the distance between the rods.

Novel features and advantages of the present invention will become apparent to one skilled in the art from a reading of the following description in conjunction with the accompanying drawings in which:

Fig. 1 is a front view in elevation of an embodiment of this invention;

Fig. 2 is a side view in elevation of the embodiment shown in Fig. 1;

Fig. 3 is an enlarged view partially in cross-section of a portion of the embodiment shown in Figs. 1 and 2; and Fig. 4 is a plan view of an example of an article dispensed from the embodiment shown in Fig. 1.

Referring to Figs. 1 and 2, a pair of stationary rods 10 are vertically mounted parallel to each other in a supporting frame work 12 by means of suitable brackets and clamps 14. Rods 10 are separated from each other at a distance substantially equal to the distance across the neck of a necked article 16, such as a measuring spoon for example (Fig. 4). Several spoons 16 are indicated in a stack between rods 10 shown in Figs. 1 and 2.

Rotatable cylinders 18 are mounted at the lower end of each of rods 10 and form a smooth continuation thereof. These cylinders include spiral projections in the form of a screw thread, for example, which extend within the space between the rods. Threads 20 are formed in a special thread having one flat face which may be described as a buttress thread. These cylinders, for example, include opposite hand threads and when rotated in opposite directions, cooperatively abstract spoons 16 from the stack and dispense them at a rate corresponding to the speed of rotation of the cylinders.

Rods 10 may be formed of tubing, stainless steel for example; and cylinders 18 are advantageously formed of a plastic material such as nylon or Teflon which has natural lubricating properties. These materials are both products of the Du Pont Company of Wilmington, Delaware, and are respectively a polyamide resin made by the polymerization of hexamethylenediamine salt of adipic acid and a tetrafluoroethylene polymer. A conveyor 22 having a series of pockets 23 passes transversely under the dispensing ends of the rods at a constant rate. One spoon is dropped into each pocket, as is later described.

A pair of spindles 24 pass through the hollow center of tubes or rods 10 and are rotatably mounted within rods 10 by means of bearings 26 positioned at the extremities of rods 10. Bearings 26 may be needle bearings, for example. Spindles 24 extend a short distance above the upper ends of rods 10 to provide a widened space for loading the spoons into the stack which lies between rods 10. An operator may easily and safely load spoons with their necks locked between the stationary rods by inserting them through the wider space provided between rotating spindles 24. Rotating spindles 24 may also conveniently be made of stainless steel for example.

A coordinated means 28 may be provided for rotating spindles 24 and attached cylinders 18 through set screws 30 in synchronism in opposite directions, for example. Coordinated drive means 28 includes a pair of meshed spur gears 32 joined to the upper ends of spindles 24. A bevel gear 34 is mounted at the upper end of one of spindles 24 and meshes with another bevel gear 36 mounted on shaft 38 which is supported between a pair of bearings 40. Shaft 38 extends past bearings 40 and supports a sprocket 42. Sprocket 42 is connected with a lower drive sprocket 44 by a sprocket chain 46. Sprocket 48 is locked to sprocket 44 and is connected to the conveyor drive, for example, to facilitate coordination of the dispenser with the conveyor.

The transmission ratio of the dispenser is coordinated with the speed of conveyor 22 so that rotating cylinders 18 abstract and dispense one article into each pocket of transversely moving conveyor 22.

Operation

As conveyor 22 moves laterally beneath the lower ends of rods 10 and cylinders 18, one spoon is dropped into each pocket of the conveyor. Additional spoons are safely loaded in the space between the rotating spindles 24. Stationary cylinders or rods 10 guide and lock the spoons in place. As the spindles and cylinders rotate in opposite directions, spoons are abstracted and discharged successively from the stack.

What is claimed is:

An apparatus for successively dispensing necked articles comprising a supporting frame, a pair of tubular rods rigidly mounted parallel to each other upon said supporting frame to provide a space between the stationary surfaces of said rods substantially corresponding to the necks of said articles for supporting a stack of said articles with their necks locked within said space, a pair of spindles rotatably mounted within said tubular rods, rotatable cylinders mounted upon said spindles to form a continuation of the ends of said tubular rods, said cylinders including spiral projections extending within said space, said spindles extending through and past said tubular rods a distance sufficient to permit said necked articles to be inserted between said spindles and the necks of said articles to be locked within said space between said stationary rods, said spindles being small enough in diameter to provide a space therebetween wide enough to permit said articles to be inserted between them to a position where said necks can be locked within said space between said stationary rods, and coordinated drive means connected to said spindles and rotating said cylinders in synchronism to cooperate in abstracting and discharging articles from said stack.

References Cited in the file of this patent

UNITED STATES PATENTS

| | | |
|---|---|---|
| 806,359 | Neureuther | Dec. 5, 1905 |
| 1,352,578 | Cameron | Sept. 14, 1920 |
| 1,525,528 | Widell | Feb. 10, 1925 |
| 1,760,441 | Risser | May 27, 1930 |
| 1,794,198 | Murray | Feb. 24, 1931 |
| 1,907,714 | Benson | May 9, 1933 |
| 1,985,697 | Stecher | Dec. 25, 1934 |